United States Patent
Imamura

(10) Patent No.: US 7,095,607 B2
(45) Date of Patent: Aug. 22, 2006

(54) ELECTRONIC APPARATUS WITH A REMOVABLE COMPONENT

(75) Inventor: Akira Imamura, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 246 days.

(21) Appl. No.: 10/785,963

(22) Filed: Feb. 26, 2004

(65) Prior Publication Data

US 2004/0233630 A1 Nov. 25, 2004

(30) Foreign Application Priority Data

Feb. 28, 2003 (JP) .............................. 2003-053049

(51) Int. Cl.
*G06F 1/16* (2006.01)
*H05K 5/00* (2006.01)

(52) U.S. Cl. ..................... 361/679; 361/735; 429/97; 710/62

(58) Field of Classification Search ........ 361/679–687, 361/724–730, 735; 429/97, 100; 312/223.1; 710/62

See application file for complete search history.

(56) References Cited

U.S. PATENT DOCUMENTS 6,373,693 B1 * 4/2002 Seto et al. .................. 361/685

2002/0144032 A1 * 10/2002 Kriege et al. ................. 710/62

FOREIGN PATENT DOCUMENTS

| JP | 7-230343 | 8/1995 |
| JP | 11-265229 | 9/1999 |
| JP | 11-330723 | 11/1999 |

OTHER PUBLICATIONS

Notification of the First Office Action, Chinese Patent Application No. 2004100072608, Apr. 15, 2005 and English language translation thereof.

* cited by examiner

*Primary Examiner*—Hung Van Duong
(74) *Attorney, Agent, or Firm*—Finnegan, Henderson, Farabow, Garrett & Dunner, L.L.P.

(57) ABSTRACT

A removable component is inserted into the receptacle provided in a housing, through an inlet port provided in the outer surface of the housing. A first lock member is provided in the housing and can move between a first lock position and a first release position. At the first lock position, the first lock member holds the removable component. At the first release position, the first lock member releases the movable component. A second lock member is provided in the housing and can move, by its weight, between the second lock position and the second release position. At the second lock position, the second lock member holds the first lock member at the first lock position. At the second release position, the second lock member is released from the second lock position.

9 Claims, 7 Drawing Sheets

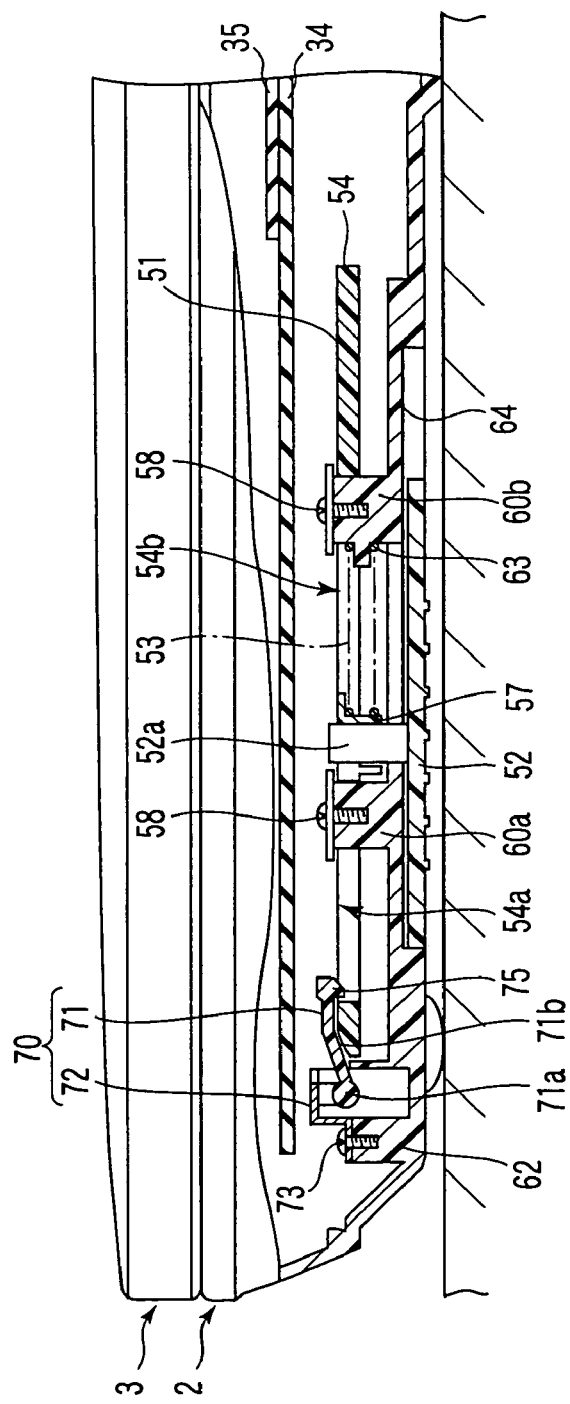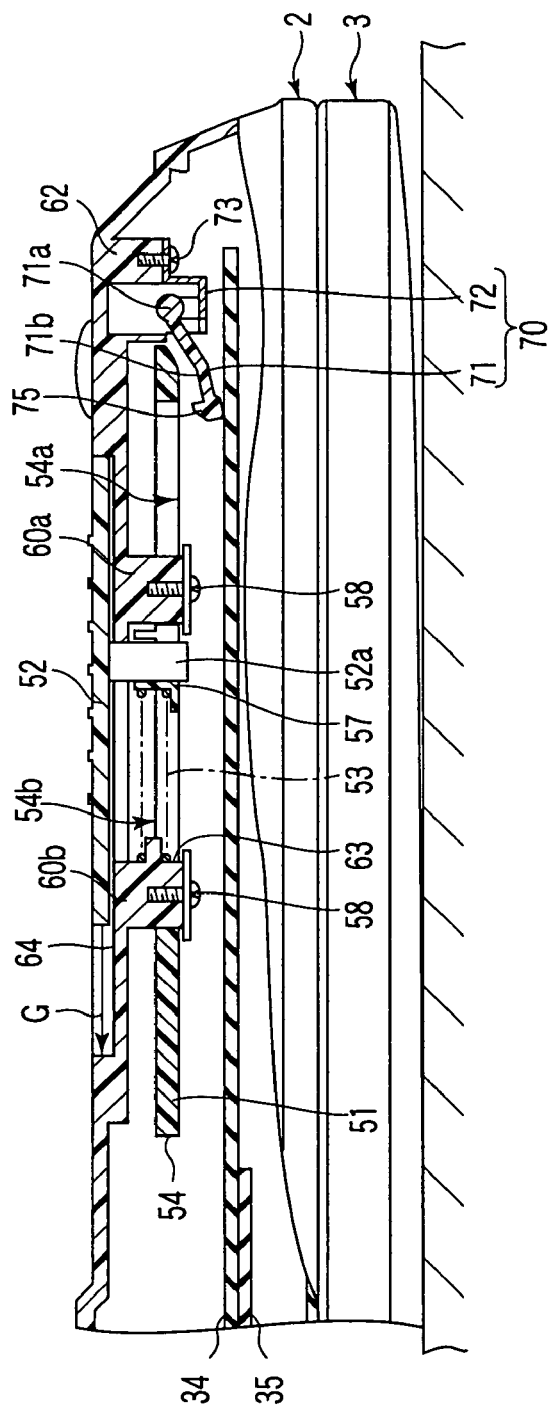
FIG. 5A
FIG. 5B

ELECTRONIC APPARATUS WITH A REMOVABLE COMPONENT

CROSS-REFERENCE TO RELATED APPLICATIONS

This application is based upon and claims the benefit of priority from the prior Japanese Patent Application No. 2003-053049, filed Feb. 28, 2003, the entire contents of which are incorporated herein by reference.

BACKGROUND OF THE INVENTION

1. Field of the Invention

This invention relates to an electronic apparatus such as a portable computer. More particularly, it relates to a structure for removably inserting, into the housing of the apparatus, a component such as a battery pack or an expansion unit having a communications interface.

2. Description of the Related Art

Electronic apparatuses such as portable computers have a battery pack. Thus, they may be used in any place where no commercial power supply is available. The battery pack is provided in the housing of the apparatus, which supports the keyboard and display unit.

The battery pack can easily removed from the housing to be recharged or replaced by a new battery pack. Computers are known whose housing has a pack receptacle in the bottom. A battery pack can be removably held in the pack receptacle. The pack receptacle is a recess made in the bottom of the housing and opening at two sides thereof. The battery pack has a first engagement member. The pack receptacle has a second engagement member. The first and second engagement members mutually engage when the battery pack is slid in the pack receptacle so to be attached to the housing. Once the engagement members so engage, the battery pack is firmly held in the pack receptacle. Once the pack is held in the pack receptacle, its bottom remains flush with the bottom of the housing, and its two sides remain flush with the sides of the housing. Thus, the battery pack looks as if it were part of the housing.

Jpn. Pat. Appln. KOKAI Publication No. 7-230343 discloses a computer. The housing of the computer has a pack receptacle and a lock mechanism. The lock mechanism holds a battery pack in the battery receptacle, preventing the pack from slipping out. The lock mechanism comprises a release lever and a lock strip. The release lever and the lock strip mutually engage. The release lever is exposed at the bottom of the housing. The lock strip can move by the release lever between a lock position and an unlock position. In the lock position, the lock strip engages with the battery pack. In the unlock position, it is disengaged from the battery pack.

A stopper is provided in the bottom of the pack receptacle. The stopper has an arm. The arm is pivotally held and can rotate by its weight, between two positions. At the first position, the arm catches the battery pack placed in the pack receptacle. At the second position, the arm is spaced from the battery pack. The arm remains at the first position as long as the housing assumes its normal position, with its top turned upwards. When the housing is turned upside down, with its bottom turned upward, the arm rotates from the first position to the second position.

As long as the housing takes its normal position, the stopper keeps holding the battery pack in the pack receptacle. Hence, the battery pack will not fall from the housing if the user of the computer operates the release lever by mistake, moving the lock strip to the unlock position. Nor will the pack fall from the housing if the user lifts the computer off the desk, forgetting that the battery pack has been unlocked.

If the user lifts up the computer disclosed in Publication No. 7-230343, forgetting that the battery pack has been unlocked, the lock strip alone takes hold of the battery pack in the pack receptacle. The battery pack is one of the heaviest components of the computer. Here arises a problem. The lock strip may not withstand the weight of the battery pack. It may be broken or removed from the housing. Consequently, the battery pack will fall from the housing.

BRIEF SUMMARY OF THE INVENTION

An electronic apparatus according to an aspect of the invention comprises: a housing having an outer surface; a receptacle provided in the housing and having an inlet port provided in the outer surface; a removable component removably inserted into the receptacle through the inlet port; a first lock member provided in the housing and being able to move between a first lock position to hold the removable component and a first release position to release the removable component; and a second lock member provided in the housing and being able to move, by its weight, between a second lock position to hold the first lock member at the first lock position and a second release position released from the second lock position.

BRIEF DESCRIPTION OF THE SEVERAL VIEWS OF THE DRAWING

FIG. 5A is a sectional view showing a part of the computer in normal position, with the bottom of the housing facing upwards;

FIG. 5B is a sectional view showing the same part of the computer turned upside down, with the bottom of the housing facing upwards;

DETAILED DESCRIPTION OF THE INVENTION

An embodiment of the invention will be described with reference to the accompanying drawings.

Figure 1:
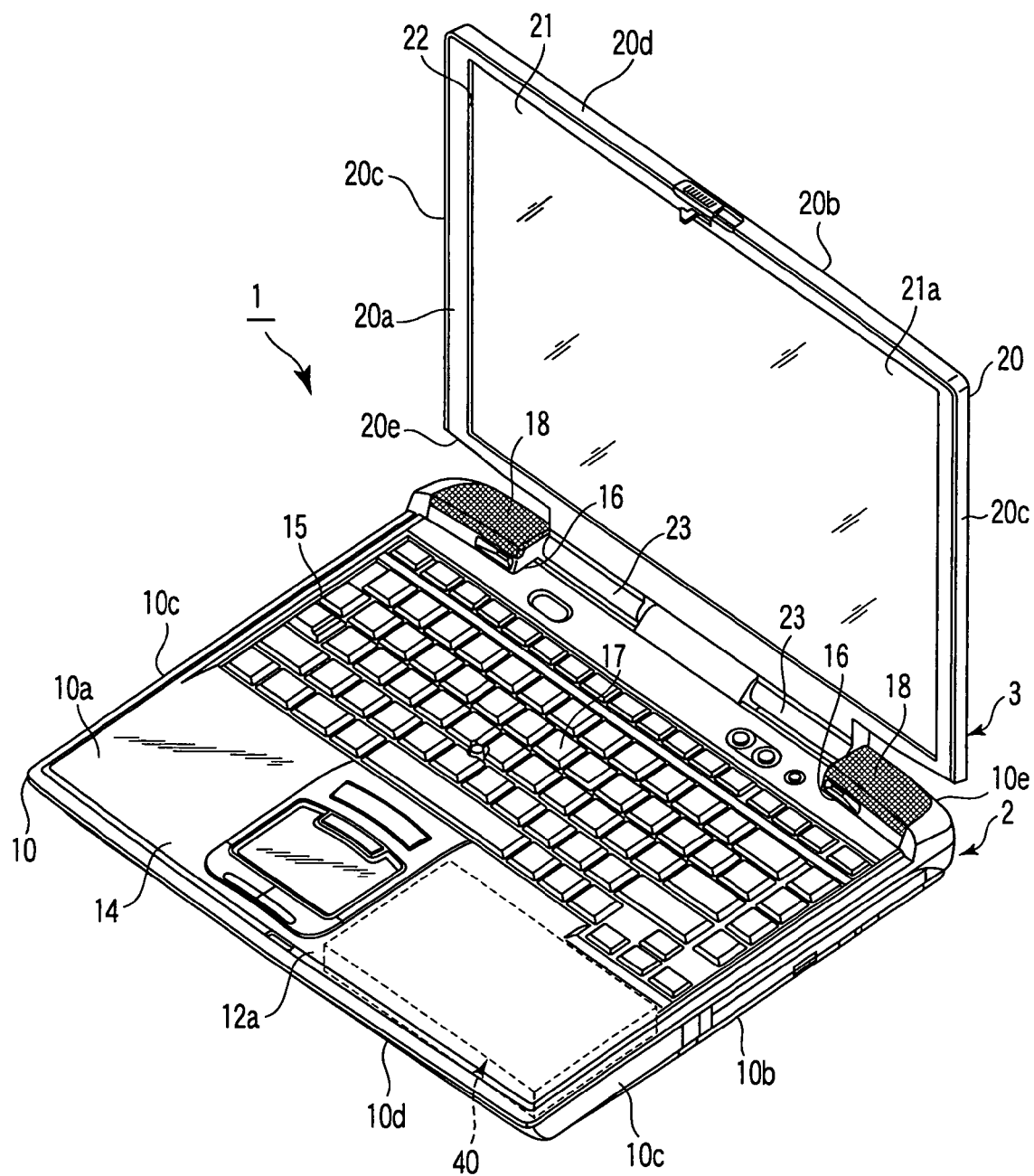
FIG. 1 is a perspective view of a portable computer according to an embodiment of the present invention.

FIG. 1 shows a portable computer 1, or an electronic apparatus. The portable computer 1 has a main unit 2 and a display unit 3. The display unit 3 lies on and above the main unit 2 as long as the computer 1 takes normal use position.

The main unit 2 comprises a housing 10. The housing 10 is shaped like a flat box. It has a top wall 10a, a bottom wall 10b, left and right side walls 10c, a front wall 10d, and a back wall 10e. The top wall 10a comprises a palm rest 14, a keyboard receptacle 15, and a pair of speaker holders 16. The palm rest 14 extends in the widthwise direction of the housing 10, along the front edge of the top wall 10a. The keyboard receptacle 15 lies behind the palm rest 14 and holds a keyboard 17. The speaker holders 16 are spaced apart in the widthwise direction of the housing 10, at the rear of the keyboard 17. They hold two speaker units 18, respectively. The speaker units 18 protrude up from the rear edge of the top wall 10a.

The display unit 3 comprises a display housing 20 and a liquid-crystal display panel 21. The display housing 20 is shaped like a flat box. It has a front wall 20a, a back wall 20b, left and right side walls 20c, an upper wall 20d, and a lower wall 20e. The front wall 20a has a rectangular opening 22. The display housing 20 holds the display panel 21. The display panel 21 has a display screen 21a that is designed to display images. The screen 21a is exposed outside the housing 20, through the rectangular opening 22.

As FIG. 1 shows, the display housing 20 has two legs 23. The legs 23 are located between the speaker units 18 that are secured to the housing 10. The legs 23 are coupled to the housing unit 20 by means of two hinges (not shown). The hinges have a rotation axis that extends parallel to the widthwise direction of the housing 10.

Hence, the display unit 3 can rotate around the axis of the hinges, from an open position to a closed position, and vice versa. While remaining in the open position, the display unit 3 stands upright on the main unit 2 as illustrated in FIG. 1. Thus, the palm rest 14, keyboard 17 and display screen 21a are exposed. While staying in the closed position, the display unit 3 lies horizontally, covering the palm rest 14 and keyboard 17 from above, as is shown in FIGS. 5A and 5B.

Figure 2:
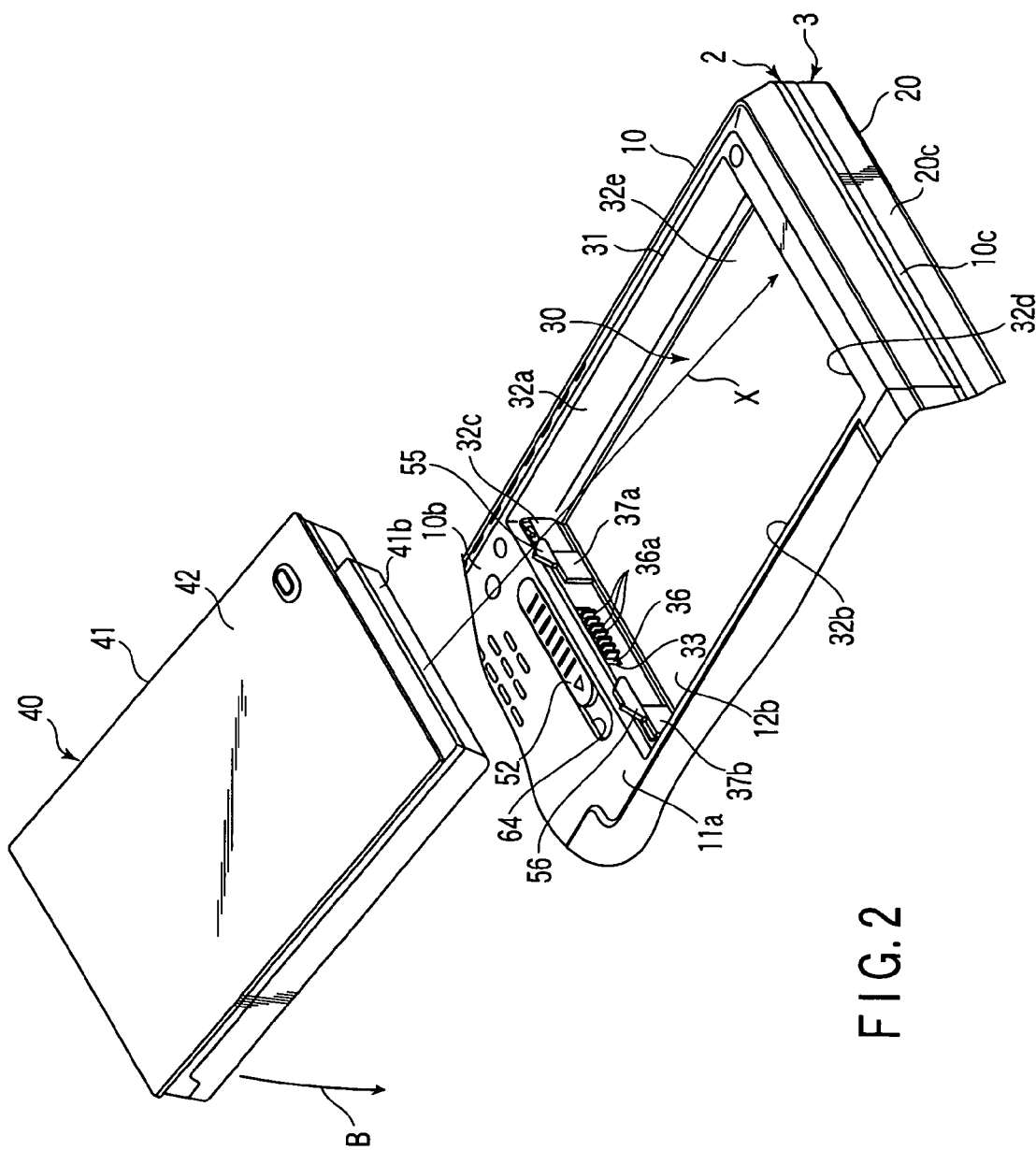
FIG. 2 is an exploded, perspective view of the housing of the computer, illustrating the receptacle and the battery pack, as viewed from the bottom of the housing.
Figure 3:
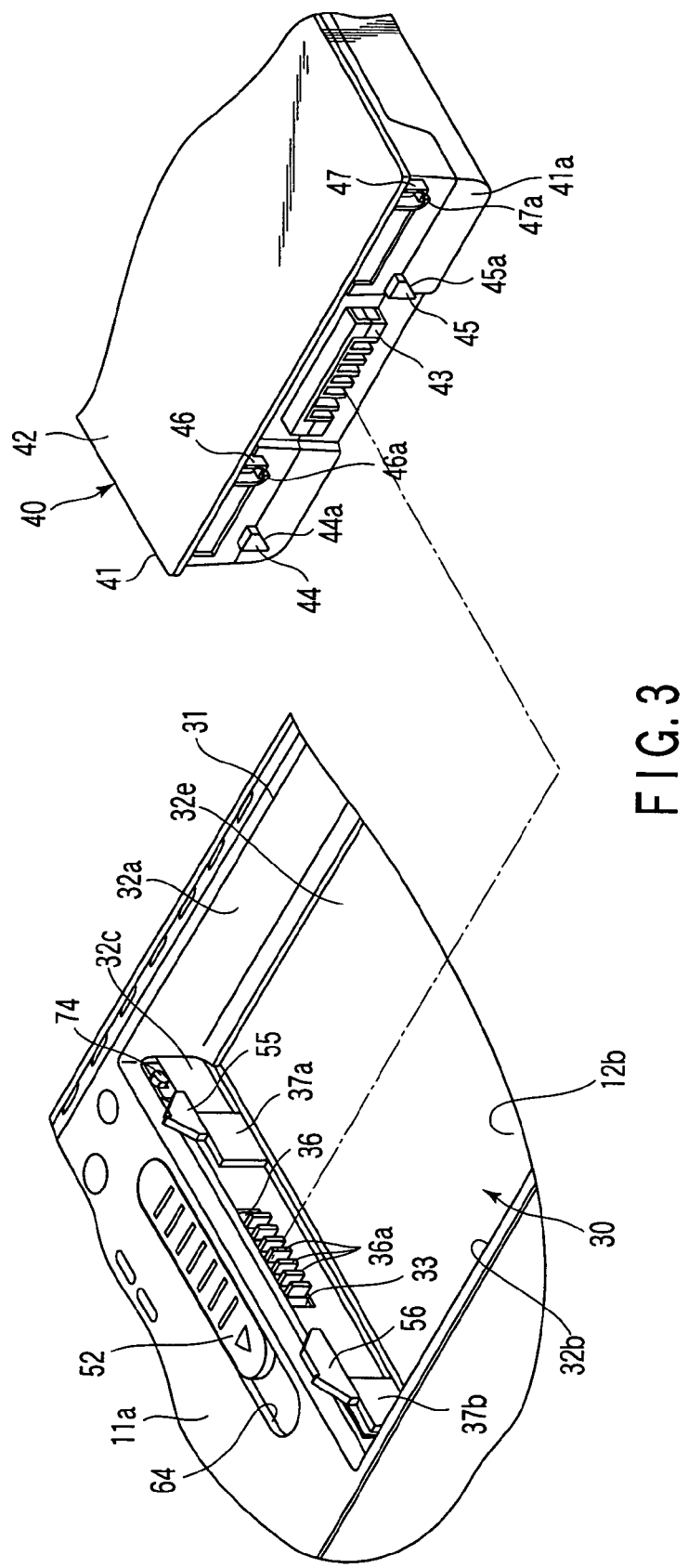
FIG. 3 is an exploded, perspective view, depicting the connector part of the receptacle and the distal end of the battery pack, as viewed from the bottom of the housing.

The housing 10 has a receptacle 30. The receptacle 30 lies beneath the palm rest 14 and extends in the widthwise direction of the housing 10. (That is, the receptacle 30 extends from the right side of the housing 10 toward the left side thereof.) As seen from FIGS. 2 and 3, the receptacle 30 has an inlet port 31. The inlet port 31 is provided in one of the walls forming the housing 10, for example in the bottom wall 10b. The receptacle 30 is a recess that is provided in the housing 10 and opens at the bottom wall 10b of the housing 10. Note that FIGS. 2 and 3 are perspective views, each showing the housing 10 turned upside down, with its lower surface 11a turned upwards.

The receptacle 30 is defined by four side walls 32a, 32b, 32c and 32d and a ceiling wall 32e. The first and second side walls 32a and 32b are continuous to the lower surface 11a of the housing 10. They oppose each other. The third and fourth side walls 32c and 32d oppose each other. The third side wall 32c connects one end of the first side wall 32a to one end of the second side wall 32b. The fourth side wall 32d connects the other end of the first side wall 32a to the other end of the second side wall 32b. The ceiling wall 32e is continuous to the four side walls 23a to 23d.

In the embodiment, the ceiling wall 32e is a part of the top wall 10a of the housing 10. The side walls 32a to 32d extend upward from the lower surface 11a of the housing 10. The side walls 32a to 32d and the ceiling wall 32e partition the interior of the housing 10, defining the receptacle 30. The side wall 32c, which lies at the middle part of the housing 10, has a connector port 33.

As shown in FIGS. 5A and 5B, a partition 34 horizontally extends in the housing 10. A printed circuit board 35 is mounted on the upper surface of the partition 34. An extension (not shown) projects from the printed circuit board 35 and is connected to a power-supply connector 36. As FIGS. 2 and 3 show, the connector 36 has contacts 36a. The contacts 36a are exposed to the receptacle 30 through the connector port 33 made in the side wall 32c.

As seen from FIGS. 2 and 3, a battery pack 40 may be removably fitted into the receptacle 30. The battery pack 40 is a power supply that drives the electric and electronic components of the computer 1 when the computer 1 is used in any place where no commercial power supply is available. It is one of the heaviest components of the portable computer 1.

The battery pack 40 has a case 41 that contains batteries (not shown). The case 41 is a rectangular box and almost identical in shape to the receptacle 30. The battery pack 40 may be fitted into the receptacle 30, through the inlet port 31 made in, for example, the bottom wall 10b of the housing 10. Once the battery pack 40 has been fitted into the receptacle 30, the outer surface 42 of the case 41 lies flush with the lower surface 11a of the housing 10. That is, the outer surface 42 of the case 41 makes a part of the lower surface 11a of the housing 10.

Therefore, the housing 10 can be thinner by the thickness of the bottom wall 10b than in the case where the receptacle 30 is provided between the top wall 10a and the bottom wall 10b. Since the receptacle 30 is open outside the housing 10, the battery pack 40 set in the receptacle 30 is exposed. Thus, the pack 40 occupies a smaller space in the housing 10 than otherwise.

As specified above, the case 41 of the battery pack 40 has almost the same shape as the receptacle 30. Therefore, the battery pack 40 would not move once it has been fitted into the receptacle 30. The inlet port 31 to the receptacle 30 is made in the lower surface 11a of the housing 10, and the receptacle 30 does not open in the upper surface 12a of the housing 10. Therefore, the outer surface 42 of the case 41 cannot be seen as long as the computer 1 is placed in normal use position, with the upper surface 12a (i.e., the outer side of the top wall 10a) of the housing 10 turned upwards. This imparts a good outer appearance to the portable computer 1.

While the battery pack 40 remains in the receptacle 30, its distal side 41a (see FIG. 3) opposes the side wall 32c of the receptacle 30. Power-supply terminals 43 are exposed through the distal side 41a. As described above, the side wall 32c has the connector port 33, and the contacts 36a of the power-supply connector 36 are exposed through the connector port 33. Therefore, the terminals 43 come into contact with the contacts 36a when the battery pack 40 is fitted into the receptacle 30. Thus, the pack 40 is electrically connected to the power-supply connector 36.

As FIG. 3 shows, two engagement projections 44 and 45 protrude from the distal side 41a of the battery pack 40. The engagement projections 44 and 45 are spaced from each other. The engagement projections 44 and 45 are spaced apart on the distal side 41a. As is best shown in FIGS. 6A to 6C and FIGS. 7A and 7B, the engagement projections 44 and 45 are triangular, having inclined faces 44a and 45a, respectively. While the battery pack 40 remains fitted in the receptacle 30, the faces 44a and 45a incline from the upper-front corner to the lower-back corner.

The housing 10 incorporates a lock mechanism for holding the battery pack 40 in the receptacle 30. The lock mechanism is provided near the side wall 32c of the receptacle 30. It comprises a first lock member 51, which can move between a first lock position and a first release position. At the first lock position, the member 51 catches the engagement projections 44 and 45 provided on the distal side 41a of the battery pack 40, thus taking hold of the pack 40 in the receptacle 30. At the first release position, the member 51 releases the engagement projections 44 and 45, making it possible to remove the battery pack 40 from the receptacle 30.

Figure 4:
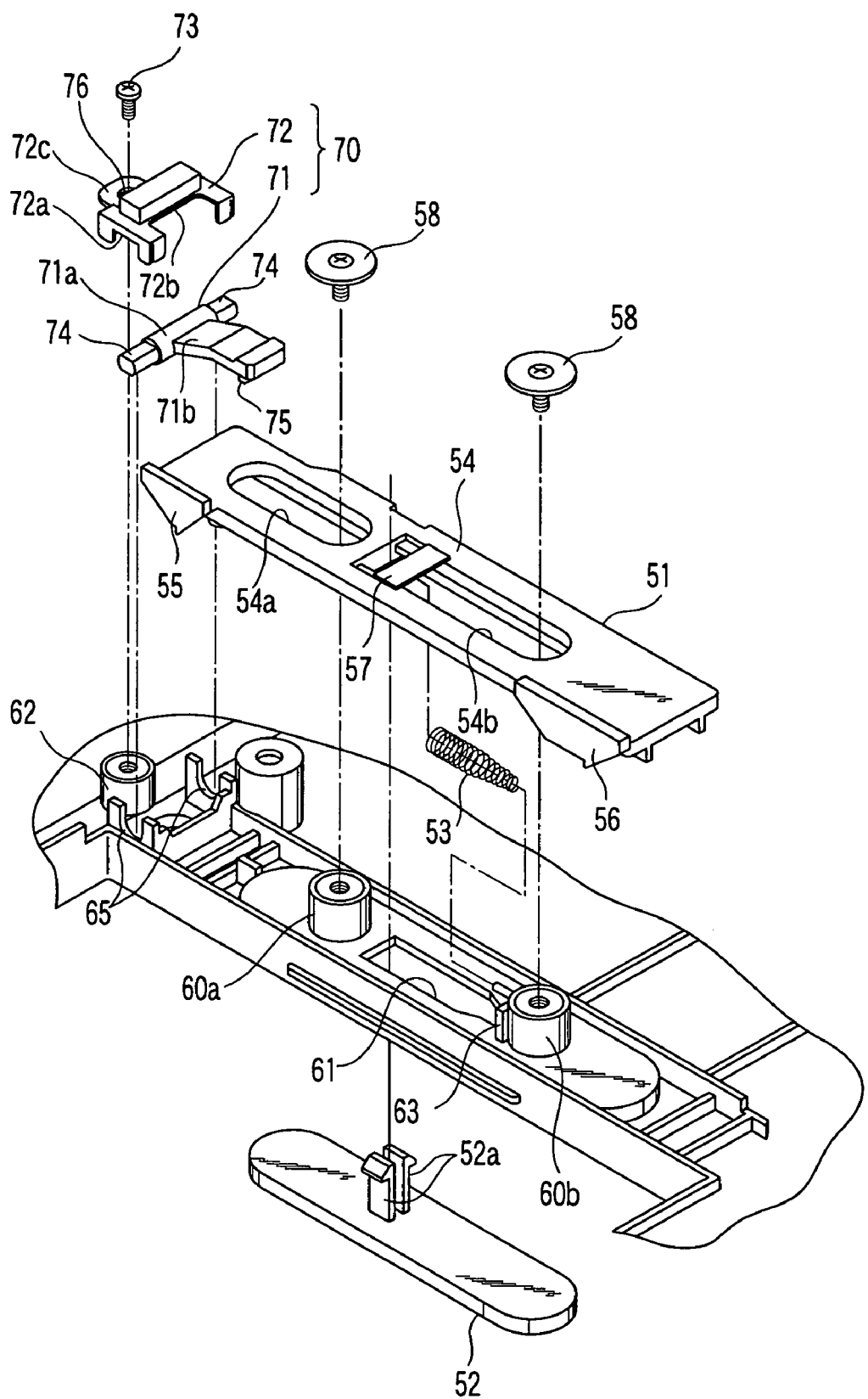
FIG. 4 is an exploded, perspective view, showing the first and second lock members provided in the housing of the computer.

More specifically, the lock mechanism has a release lever 52 and a coil spring 53 in addition to the first lock member 51, as is illustrated in FIGS. 2 to 4, FIGS. 5A and 5B and FIGS. 6A to 6C. FIG. 4 shows the lock mechanism as viewed from above the housing 10 positioned with its the lower surface 11a turned downwards.

As FIG. 4 shows, the first lock member 51 comprises a main body 54, a first engagement strip 55, and a second engagement strip 56. The main body 54 is shaped like a rectangular plate. It has two openings 54a and 54b, both made in the mid part. The first opening 54a is closer to the front end of the main body 54 than the second opening 54b. An L-shaped abutment plate 57 is fastened to the main body 54, extending across the second opening 54b. The abutment plate 57 divides the second opening 54b into two regions.

The first engagement strip 55 is shaped like an inverted triangle, gradually narrowing downwards. The second engagement strip 56 is shaped like an inverted trapezoid, gradually narrowing toward the lower side. Thus, the first engagement strip 55 has two inclined sides 55a and 55b. The second engagement strip 56 has two inclined sides 56a and 56b. In FIGS. 2 and 3, FIGS. 6A to 6C and FIGS. 7A and 7B, the engagement strips 55 and 56 gradually narrow upwards. This is because these figures show the housing 10 turned upside down, with its lower surface 11a turned upwards.

Figure 6A:
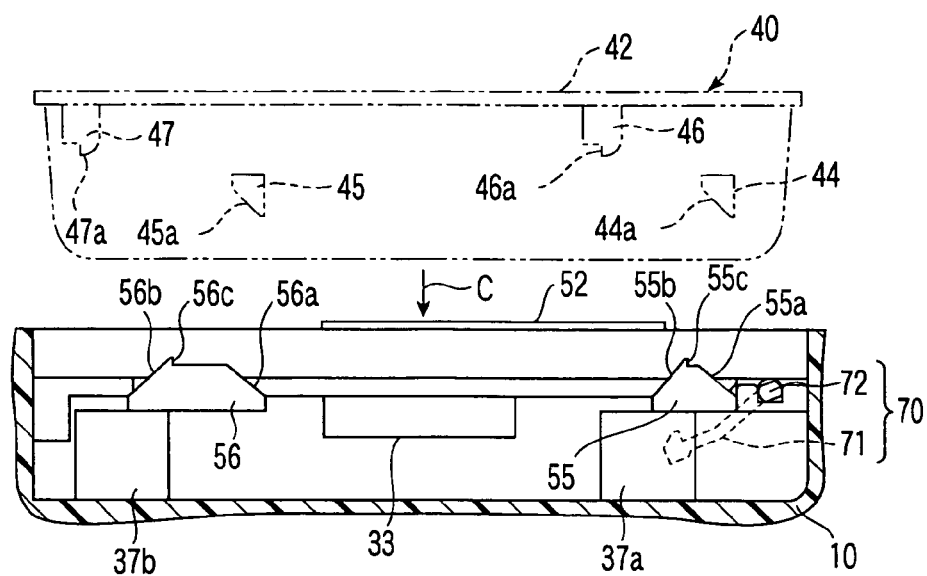
FIGS. 6A to 6C are sectional views of a part of the computer, explaining how the battery pack is inserted into the receptacle.
Figure 6B:
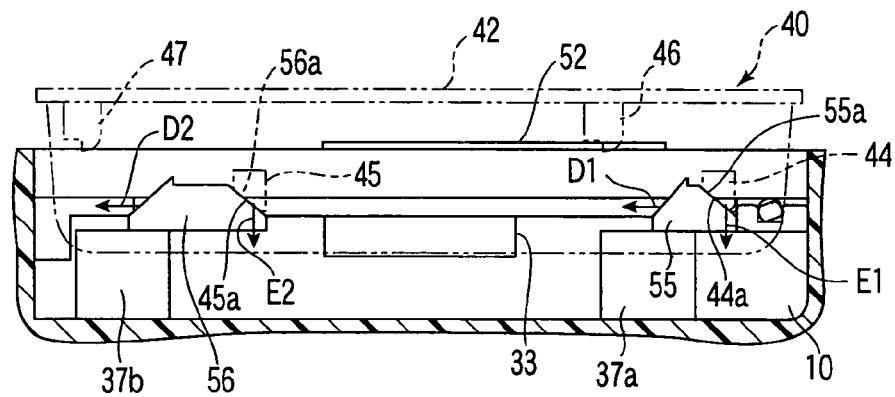
Figure 6C:
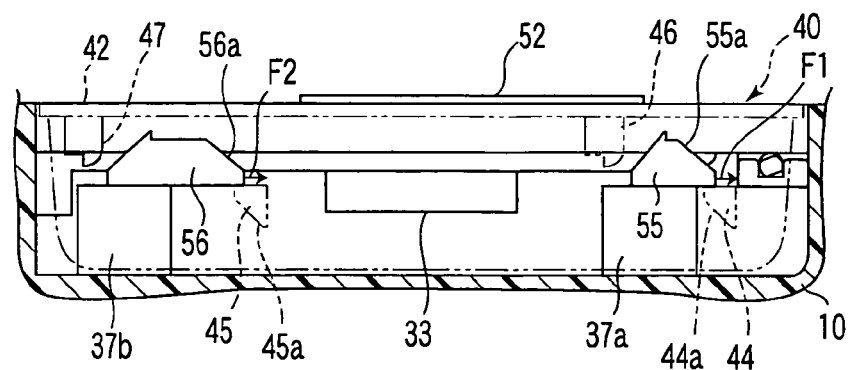

As FIG. 6A shows, the lower edges of the first and second engagement strips 55 and 56 are cut, forming a claw 55c and a claw 56c, respectively, at their lower-back corners. The claws 55c and 56d are shaped like a triangle. The engagement strips 55 and 56 are secured to one lateral edge of the main body 54 and spaced apart in the lengthwise direction of the main body 54. The engagement strips 55 and 56 extend at right angles to the main body 54 that horizontally extends.

Two bosses 60a and 60b are provided on the upper surface (inner surface) 11b of the bottom wall 10b of the housing 10. The bosses 60a and 60b are spaced apart and vertically aligned with the first and second openings 54a and 54b made in the main body 54 of the first lock member 51. The bottom wall 10b has an opening 61, which is located between the bosses 60a and 60b. An abutment plate 63 is secured to the second boss 60b. The plate 63 opposes the abutment plate 57 fastened to the main body 54 of the first lock member 51. As FIG. 4 depicts, the first lock member 51 is fastened to the bosses 60a and 60b with two screws 58. The first and second engagement strips 55 and 56 are exposed in the receptacle 30.

As illustrated in FIGS. 2 and 3, a guide groove 64 is cut in the lower surface 11a of the housing 10. The release lever 52 is provided in the guide groove 64 and can slide back and forth. The release lever 52 is exposed at the lower surface 11a of the housing 10 and can be accessed from outside the housing 10. It can therefore be moved back and forth in the guide groove 64. As FIG. 4 shows, a pair of claws 52a projects from the upper surface of the release lever 52. The claws 52a pass through the front part of the second opening 54b made in the first lock member 51 and latch on the lateral rims of the second opening 54b. Thus, when the release lever 52 is moved back or forth by the user of the computer 1, the first lock member 51 slides back or forth with the release lever 52. As FIGS. 2 and 3 show, support strips 37a and 37b are secured to the side wall 32c of the receptacle 30. These strips 37a and 37b support the first and second engagement strips 55 and 56, respectively.

Figure 7A:
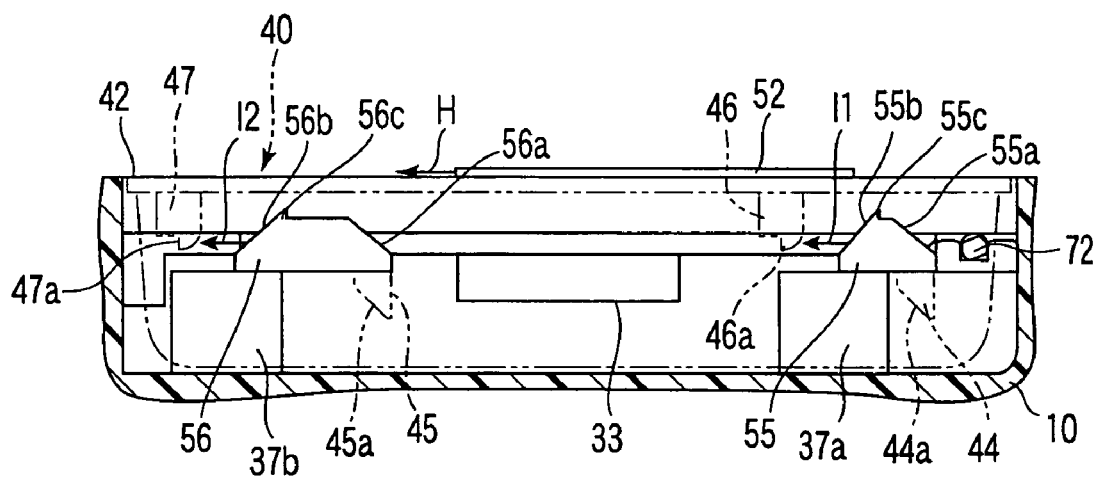
FIGS. 7A and 7B are sectional view of the part of the computer, explaining how the battery pack is removed from the receptacle.

As FIG. 7A shows, the first engagement strip 55 and second engagement strip 56 catch the first engagement projection 44 and second engagement projection 45 provided on the battery pack 40, respectively, when the release lever 52, or the first lock member 51, is moved forwards. The battery pack 40 is thereby held in the receptacle 30. Hereinafter, the position the pack 40 assumes while so held in the receptacle 30 will be referred to as "first lock position."

Figure 7B:
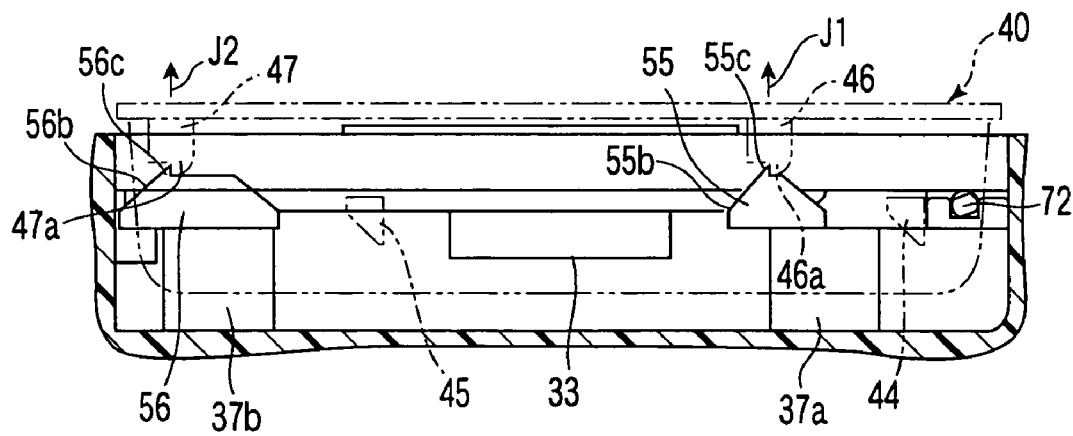

As FIG. 7B depicts, the first engagement strip 55 and second engagement strip 56 release the first engagement projection 44 and second engagement projection 45, respectively, when the release lever 52, or the first lock member 51, is moved backwards. Hence, the battery pack 40 can be removed from the receptacle 30. Hereinafter, the position the pack 40 takes in the receptacle 30, not caught by the first engagement strip 55 or the second engagement strip 56, will be referred to as "first release position."

The coil spring 53 is interposed between the abutment plate 57 fastened to the first lock member 51 and the abutment plate 63 secured to the second boss 60b. The coil spring 53 biases the first lock member 51 and the release lever 52 toward the first lock position.

How the battery pack 40 is fitted into the receptacle 30 will be explained, with reference to FIG. 2, FIGS. 6A to 6C and FIGS. 7A and 7B.

First, the display unit 3 is rotated to the closed position, whereby the portable computer 1 assumes a shape of a flat box. Then, the computer 1 is turned upside down and placed on, for example, a desk. In this condition, the lower surface 11a of the housing 10 remains turned upwards. As shown in FIG. 2, the battery pack 40 is inserted into the receptacle 30, first at the proximal side 41b (FIG. 3) that has no terminals. The pack 40 is pushed in the direction of arrow X until the proximal side 41b abuts on the side wall 32d that opposes the side wall 32c having the connector port 33. Then, the battery pack 40 is rotated in the direction of arrow B in FIG. 2 or arrow C in FIG. 6A, around a line at which the proximal side 41b contacts the side wall 32d. The battery pack 40 therefore approaches the ceiling wall 32e, with its distal side 41a opposing the side wall 32c. At this time, the first lock member 51, which is biased by the coil spring 53, stops at the first lock position.

As the battery pack 40 approaches the ceiling wall 32e, the inclined face 44a of the first engagement projection 44 contacts the inclined side 55a of the first engagement strip 55. Simultaneously, the inclined face 45a of the second engagement projection 45 contacts the inclined side 56a of the second engagement strip 56. As the pack 40 further approaches the ceiling wall 32e, the inclined faces 44a and 45a move toward the ceiling wall 32e in the directions of arrows E1 and E2 (FIG. 6B), pushing the first and second engagement strips 55 and 56 backwards as indicated by arrows D1 and D2. The pack 40 is further inserted into the receptacle 30. When the outer surface 42 of the case 41 becomes flush with the lower surface 11a of the housing 10, the first and second engagement projections 44 and 45 are closer to the ceiling wall 32e. Their inclined faces 44a and 45a no longer contact the inclined side 55a of the first engagement strip 55 and the inclined side 56a of the second engagement strip 56, respectively. As a result, the first lock member 51 moves back to the first lock position in the directions of arrows F1 and F2. This is because it is biased forward by the coil spring 53. The first and second engagement projections 44 and 45 catch the first and second engagement strips 55 and 56, respectively, as illustrated in FIG. 7A. The battery pack 40 is thereby held in the receptacle 30 and electrically connected to the power-supply connector 36. Now that the first lock member 51 stops at the first lock position, it detains the battery pack 40 in the receptacle 30.

The portable computer 1 has a second lock member 70. The second lock member 70 controls the motion of the first lock member 51 in accordance with the position that the housing 10 takes.

As FIG. 4 and FIGS. 5A and 5B show, the second lock member 70 comprises an arm portion 71 and a fastener 72. The arm portion 71 has a shaft 71a and an arm 71b. The shaft 71a has two pins 74 at both ends. The arm 71b extends from the shaft 71a, almost at right angles to the shaft 71a. A hook 75, which is bent downwards, is provided at the distal end of the arm 71b.

A pair of bearings 65 is provided on the inner surface 11b of the bottom wall 10b of the housing 10. A boss 62 is provided also on the inner surface 11b of the bottom wall 10b and positioned in front of the bearings 65. The bearings 65 are arranged to support the shaft 71a such that the axis of the shaft 71a intersects at about right angles with the shaft 71a.

The fastener 72 covers the shaft 71a from above and connects the arm portion 71 to the housing 10, allowing the arm portion 71 to rotate freely. The fastener 72 is shaped like a box, having an open. bottom. The fastener 72 has two notches 72b (only one shown) cut in the side walls. The notches 72b open at the lower edge of these side walls. A notch 72b is cut in the top wall and rear wall of the fastener 72. This notch 72b opens at the lower edge of the rear wall. A projection 72c protrudes from the lower edge of the front wall of the fastener 72 and extends almost at right angles to the front wall. The projection 72c has a screw hole 76, through which a screw 73 passes.

The screw 73 fastens the fastener 72 to the boss 62. The arm portion 71 can therefore rotate up and down, between one position where its engagement part abuts on the upper edge of the notch 72b and another position where its engagement part is fitted in the first opening 54a of the first lock member 51.

When the computer 1 is placed in normal use position, with the upper surface 12a of the housing 10 turned upwards, the second lock member 70 rotates by its weight. As a result, the engagement part of the arm portion 71 rotates to a second release position. At the second release position, the engagement part of the arm portion 71 is caught in the first opening 54a of the first lock member 51 as illustrated in FIG. 5A. The first lock member 51 is thereby held at the first lock position. That is, while the computer 1 remains in the normal use position, with the upper surface 12a of the housing 10 turned upwards, the first lock member 51 is prevented from moving from the first lock position to the first release position. Hence, the release lever 52 would not malfunction.

When the computer 1 is turned upside down, with the lower surface 11a of the housing turned upwards, the second lock member 70 rotates, by its weight, to the second release position. At the second release position, where the engagement part of the arm portion 71 is released from the first lock member 51 as shown in FIG. 5B. The first lock member 51 is allowed to move from the first lock position to the first release position.

As indicated above, the outer surface 42 of the case 41 is flush with the outer surface of the bottom wall 10b, i.e., the lower surface 11a of the housing 10. This makes it difficult for the user to remove the battery pack 40 from the receptacle 30, even if the user has moved the release lever 52 to the release position.

To make it easy to remove the pack 40 from the receptacle 30, the computer 1 has a lift mechanism. The lift mechanism causes at least one part of the battery pack 40 inserted in the receptacle 30 to project from the housing 10 through the inlet port 31 when the first lock member 51 is moved to the first release position. Said at least one part of the pack 40 is, for example, the distal side 41a. The lift mechanism comprises two projections 46 and 47 and a lifting section. The projections 46 and 47 are provided on the battery pack 40. The lifting section is provided on the first lock member 51. In the present embodiment, the lifting section comprises the first lock member 51, the first engagement strip 55 and the second engagement strip 56.

The first projection 46 and the second projection 47 are provided on the distal side 41a of the battery pack 40. The projections 46 and 47 are spaced apart by almost the same distance as the first and second engagement projections 44 and 45 are spaced apart. The projections 46 and 47 are located closer to the bottom of the case 41 than the first and second engagement projections 44 and 45. While the battery pack 40 remains in the receptacle 30, the first projection 46 lies closer to the center of the housing 10 than the first engagement projection 44. The second projection 47 lies closer to the center of the housing 10 than the second engagement projection 45. The projections 46 and 47 gradually narrow toward their distal ends. Their distal ends are shaped in a specific way, forming triangular claws 46a and 47a, respectively.

The battery pack 40 can be removed from the receptacle 30 in the following manner, as will be explained with reference to FIGS. 5A and 5B and FIGS. 6A to 6C.

First, the display unit 4 is rotated to the closed position. The Portable computer 1 therefore assumes a shape of a flat box. The computer 1 is then turned upside down and placed on, for example, a desk. In this condition, the lower surface 11a of the housing 10 remains turned upwards. As a result, the second lock member 70 moves to the second release position by its weight, where the engagement part of the arm portion 71 is released from the first lock member 51 (see FIG. 5B and FIG. 6A). The first lock member 51 can therefore be moved from the first lock position to the first release position.

Before the housing 10 is turned upside down, it assumes the normal use position, with is lower surface 11a of the housing 10 remains turned downwards. In this condition, the second lock member 70 lies, by its weight, at the second lock position as illustrated in FIG. 5A. At the second lock position, the engagement part of the arm portion 71 is caught in the first opening of the first lock member 51. The second lock member 70 prevents the first lock member 51 from being moved backwards. Thus, the user cannot slide the release lever 52 if he or she tries, while the upper surface 12a of the housing 10 remains turned upwards. This prevents malfunction of the release lever 52. The battery pack 40 remains held in the receptacle 30, as long as the upper surface 12a of the housing 10 is turned downwards.

Next, the release lever 52 is slid backwards, in the direction of arrow G shown in FIG. 5B or arrow H shown in FIG. 7A. The first lock member 51 is thereby moved from the first lock position to the first release position. As the release lever 52 is moved backwards, the first and second engagement strips 55 and 56 move backwards, in the directions of arrows I1 and I2 shown in shown in FIG. 7A. The inclined side 55b of the first engagement strip 55 and the inclined side 56b of the second engagement strip 56 contact the first and second projections 46 and 47 that are provided on the distal side 41a of the battery pack 40. The distal side 41 of the battery pack 40 therefore projects from the housing 10 through the inlet port 31, in the directions of arrows J1 and J2 shown in FIG. 7B. FIG. 7B depicts the first lock member 51 moved to the first release position. In this condition, the claws 55c and 56c provided on the first and second engagement strips 55 and 56, respectively, engages with the claws 46a and 47a that are provided at the distal ends of the projections 46 and 47, respectively. Thus, when the release lever 52 is moved to the release position, the first lock member 51 stops, with the distal side of the battery pack 40 projecting from the housing 10 through the inlet port 31. The user may holds the distal end portion of the battery pack 40, which is protruding from the housing 10, and may pull the battery pack 40 out. The user can thus remove the pack 40 from the receptacle 30. When the battery pack 40 is pulled out of the receptacle 30, the claws 55c and 56c on the first and second engagement strips 55 and 56 disengage from the claws 46a and 47a provided at the distal ends of the projections 46 and 47. As a result, the first lock member 51 moves forward, biased by the coil spring 53, until it stops at the first lock position.

As described earlier, the portable computer 1 comprises the second lock member 70 that can move by its weight between the second lock position and the second release position. At the second lock position, the second lock member 70 engages with the first lock member 51 and holds the first lock member 51 at the first lock position. At the second release position, the second lock member 70 released from the second lock position. Consequently, the second lock member 70 releases the first lock member 51.

When the housing 10 assumes a predetermined position, the second lock member 70 releases the first lock member 51, allowing the first lock member 51 to moved from the first lock position to the first release position. When the housing 10 is changed in position, the second lock member 70 engages with the first lock member 51, holding the first lock member 51 at the first lock position. In this case, the first lock member 51 is prevented from moving from the first lock position to the first release position. In other words, when the housing 10 does take the predetermined position (at which its lower surface 11a is turned upwards, in the embodiment), the first lock member 51 cannot move from the first lock position to the first release position even if the release lever 52 is operated. This prevents the battery pack 40 from falling from the receptacle 30 even if the first lock member 51 is erroneously operated. If the battery pack 40 fell onto the floor, it would be broken or it would damage the floor.

In the embodiment, the inlet port 31 of the receptacle 30 is made in the lower surface 11a of the housing 10. The second lock member 70 moves to the second lock position when the housing 10 is so positioned that its lower surface 11a is turned downwards. It moves to the second release position when the housing 10 is so positioned that its lower surface 11a is turned upwards. Thus, the first lock member 51 would not lie at the first release position when the computer 1 takes the normal use position, with the housing 10 placed on a table. Hence, the battery pack 40 would not fall when the computer 1 is lifted from the table, though the inlet port 31 of the receptacle 30 is made in the lower surface 11a of the housing 10.

In addition, the lift mechanism causes at least one part of the battery pack 40 inserted in the receptacle 30 to project from the housing 10 through the inlet port 31 when the first lock member 51 is moved to the first release position. Therefore, the battery pack 40 be easily removed from the receptacle 30, merely by moving the first lock member 51 to the first release position and holding the distal side of the pack 40 and pulling the pack 40 out, even if the outer surface 42 of the case 41 is flush with the lower surface 11a of the housing 10.

The first lock member 51 has two engagement strips 55 and 56 that are spaced from each other. Further, the battery pack 40 has two engagement projections 44 and 45 that engage with the engagement strips 55 and 56, respectively. The battery pack 40 can therefore be firmly and steadily held in the receptacle 30. That is, the pack 40 is prevented from moving in the receptacle. Further, since the weight of the battery pack 40 is dispersed to two engagement strips 55 and 56, each strip receives but a small force. The engagement strips 55 and 56 and the engagement projections 44 and 45 can be smaller as long as the engagement strips 55 and 56 can steadily hold the engagement projections 44 and 45, and hence the battery pack 40.

In the embodiment, the first lock member has two engagement strips and the battery pack has two engagement projections. Nonetheless, the first lock member has only one engagement strip or three or more engagement strips, and the battery pack may have only one engagement projection or three or more engagement projections.

In the embodiment, the removable component is a battery pack. Nevertheless, the removable component is not limited to a battery pack in this invention. For example, it may be an expansion unit that has a communications interface.

The electronic apparatus according to this invention is not limited to a portable computer. The invention can be applied to any other types that have a removable component, such as an electronic pocket diary, a PDA and the like.

What is claimed is:

1. An electronic apparatus comprising:
   a housing having an outer surface;
   a receptacle provided in the housing and having an inlet port provided in the outer surface;
   a removable component removably inserted into the receptacle through the inlet port, the removable component having a case with an outer surface which is flush with the outer surface of the housing while the removable component remains inserted in the receptacle;
   a first lock member provided in the housing and being able to move between a first lock position to hold the removable component and a first release position to release the removable component; and
   a second lock member provided in the housing and being able to move, by a weight of the second lock member, between a second lock position to hold the first lock member at the first lock position and a second release position released from the second lock position.

2. The electronic apparatus according to claim 1, wherein the removable component is a battery pack.

3. The electronic apparatus according to claim 1, further comprising a lift mechanism causing at least one part of the removable component to project from the receptacle when the first lock member is moved to the first release position.

4. The electronic apparatus according to claim 1, wherein the outer surface of the housing is the bottom surface of the housing, and the inlet port is provided in the bottom surface.

5. The electronic apparatus according to claim 3, wherein the lift mechanism has at least one projection and a lifting section, the projections being provided on the removable component, and the lifting section being provided on the first lock member and designed to contact the projection to push at least one part of the removable component from the housing through the inlet port when the first lock member is moved to the first release position.

6. The electronic apparatus according to claim 5, wherein the first lock member has at least one engagement strip, and the removable component has at least one projection which engages with the engagement strip when the first lock member is moved to the first lock position.

7. The electronic apparatus according to claim 6, wherein the at least one engagement strip serves as the lift section.

8. The electronic apparatus according to claim 4, wherein the second lock member is provided in the housing, to move to the second lock position when the housing is positioned with the bottom surface turned downwards and to move to the second release position when the housing is positioned with the bottom surface turned upward.

9. The electronic apparatus according to claim 8, wherein the second lock member has an arm portion which is provided in the housing, to rotate up and down between the second lock position and the second release position.

* * * * *